Figure 1:
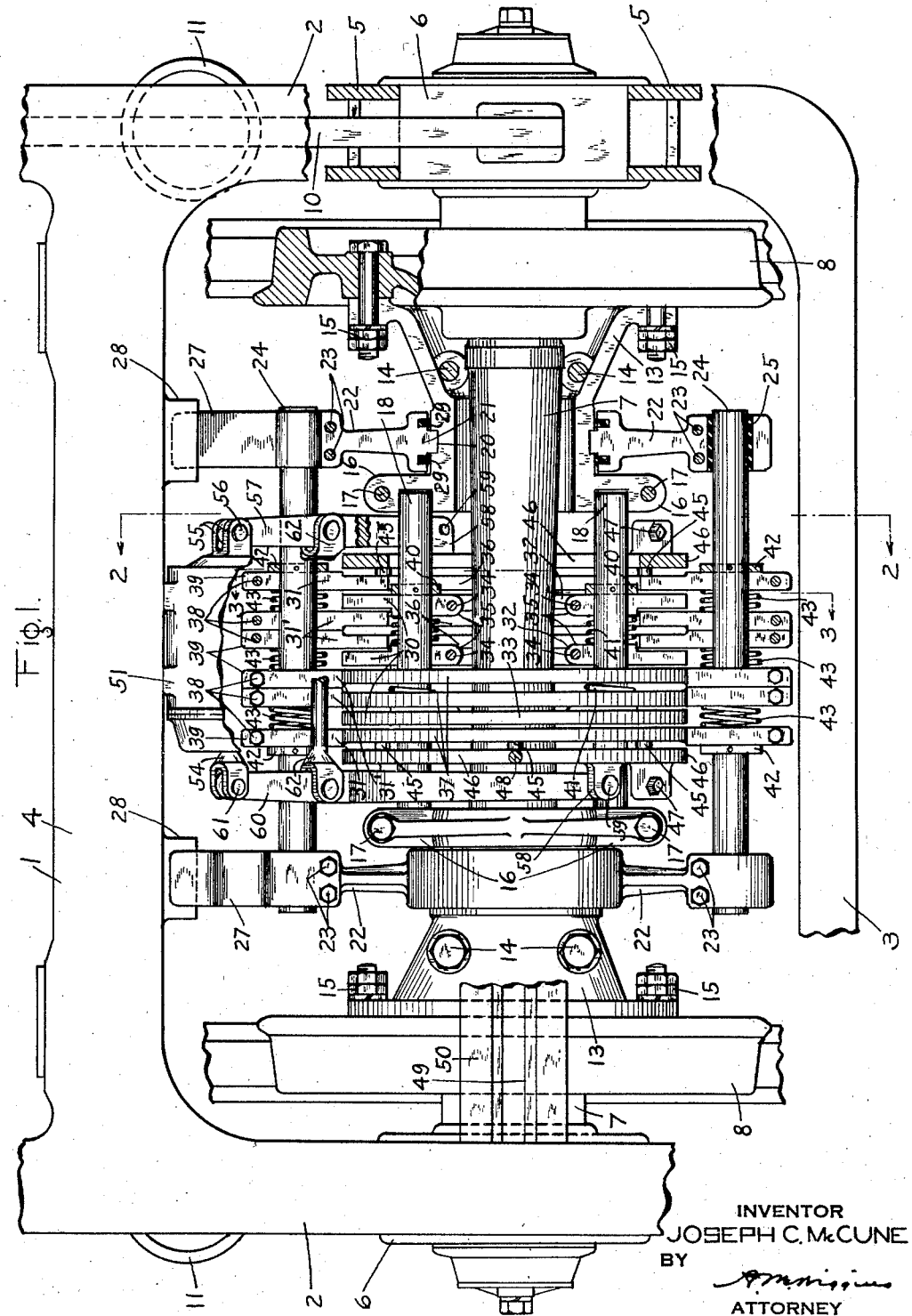

Sept. 26, 1939.　　　J. C. McCUNE　　　2,174,405
BRAKE MECHANISM
Filed Jan. 20, 1938　　　3 Sheets-Sheet 3

INVENTOR
JOSEPH C. McCUNE
BY
ATTORNEY

Patented Sept. 26, 1939

2,174,405

UNITED STATES PATENT OFFICE 2,174,405

BRAKE MECHANISM

Joseph C. McCune, Edgewood, Pa., assignor to The Westinghouse Air Brake Company, Wilmerding, Pa., a corporation of Pennsylvania Application January 20, 1938, Serial No. 185,822

26 Claims. (Cl. 188—59)

This invention relates to brake mechanism for railway vehicles or the like and more particularly to the friction disc type for use on wheel and axle assemblies of railway vehicle trucks.

In my pending application Serial No. 185,179 filed January 15, 1938 there is disclosed a disc brake mechanism which encircles the axle and is secured to the wheels of a wheel and axle assembly of a vehicle truck and which comprises an annular brake cylinder device and a set of interleaved rotatable and non-rotatable annular friction brake elements arranged at each side of the brake cylinder device for control thereby to brake the assembly. The brake cylinder device itself comprises a plurality of small fluid pressure operated brake cylinders arranged radially around the axle in an annular casing and in each brake cylinder there is provided a pair of oppositely working pistons for controlling the friction elements.

The conventional fluid pressure brake system employs only one brake cylinder device for controlling the brakes on a vehicle truck. This one brake cylinder device is of course relatively large in diameter as compared to the several brake cylinders above referred to and is usually carried by the vehicle body or some sprung portion of the vehicle truck.

One object of the present invention is to provide a disc brake mechanism of the above general type arranged for control by a conventional type of brake cylinder mounted in the usual manner on any suitable sprung portion of a vehicle such as the body of the vehicle or frame of the vehicle truck.

Another object of the invention is to provide an improved brake mechanism embodying interleaved rotatable and non-rotatable annular friction elements encircling the axle of a wheel and axle assembly and a single brake cylinder device carried by the frame of a vehicle truck and operatively connected to said elements for controling the operation thereof to brake said wheels.

The frame of some vehicle trucks is resiliently supported by the truck wheels through the medium of suitable springs and is therefore adapted to move vertically relative to the wheels, due for instance to changes in the load carried by the truck. It will therefore be evident that when a brake cylinder is carried by the frame of such a truck it will move vertically relative to the annular friction brake elements of a disc brake mechanism of the type encircling the axle and secured to the wheels of a wheel and axle assembly, and another object of the invention is therefore to provide in a construction such as just described improved means for transmitting pressure from the brake cylinder to the friction elements, said improved means being adapted, in all vertical positions which the truck may assume relative to the axle, to cause the same braking torque to be developed at the wheels for a given fluid pressure acting in the brake cylinder.

Other objects and advantages will be apparent from the following more detailed description of the invention.

Figure 2:
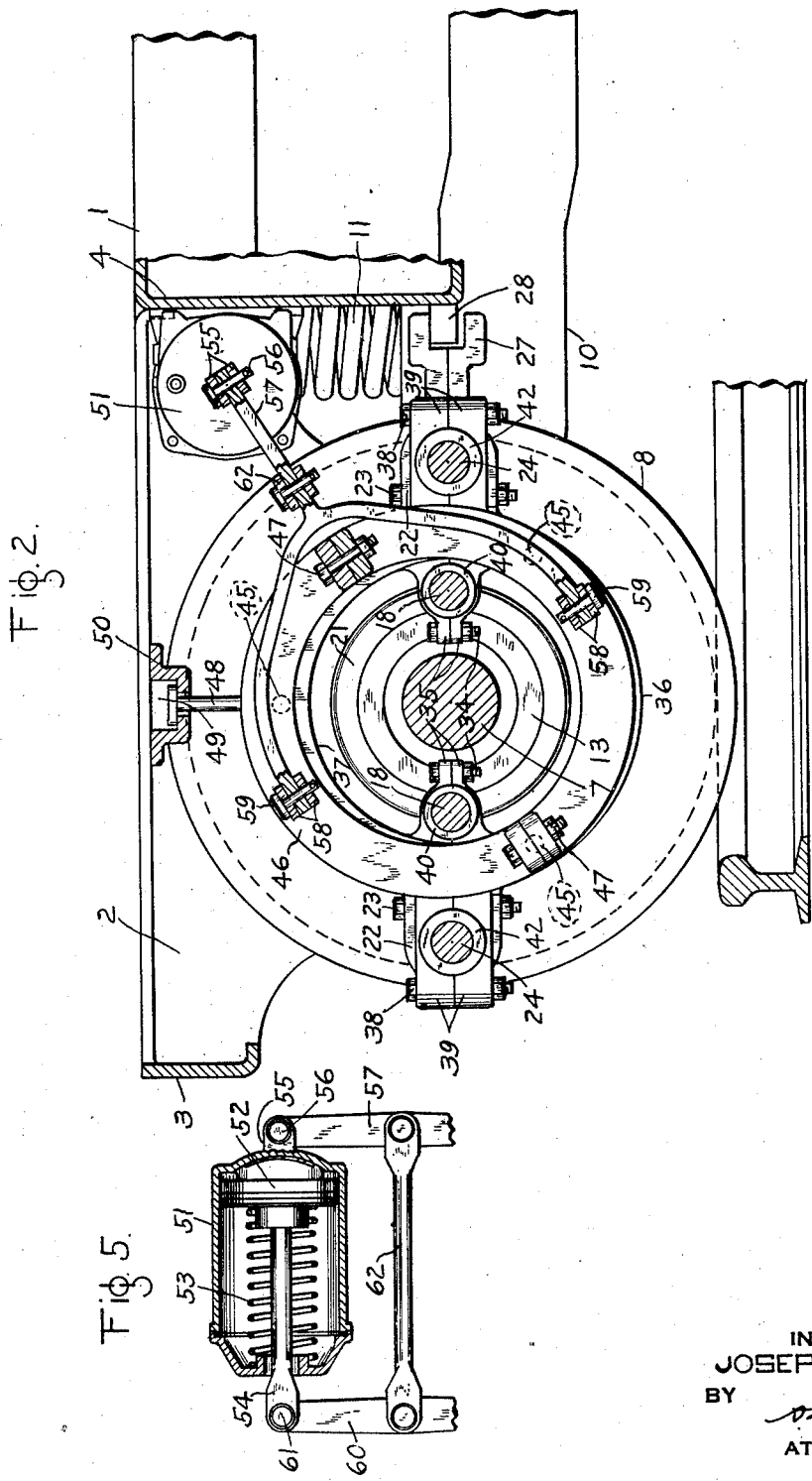
Figure 3:
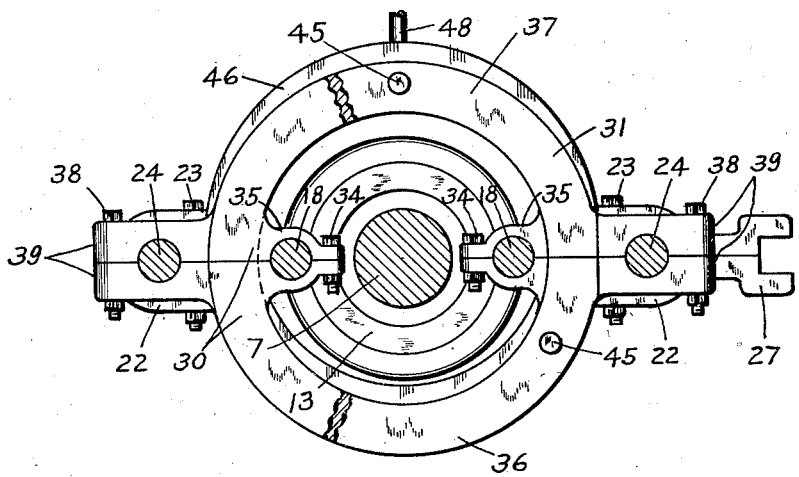
Figure 4:
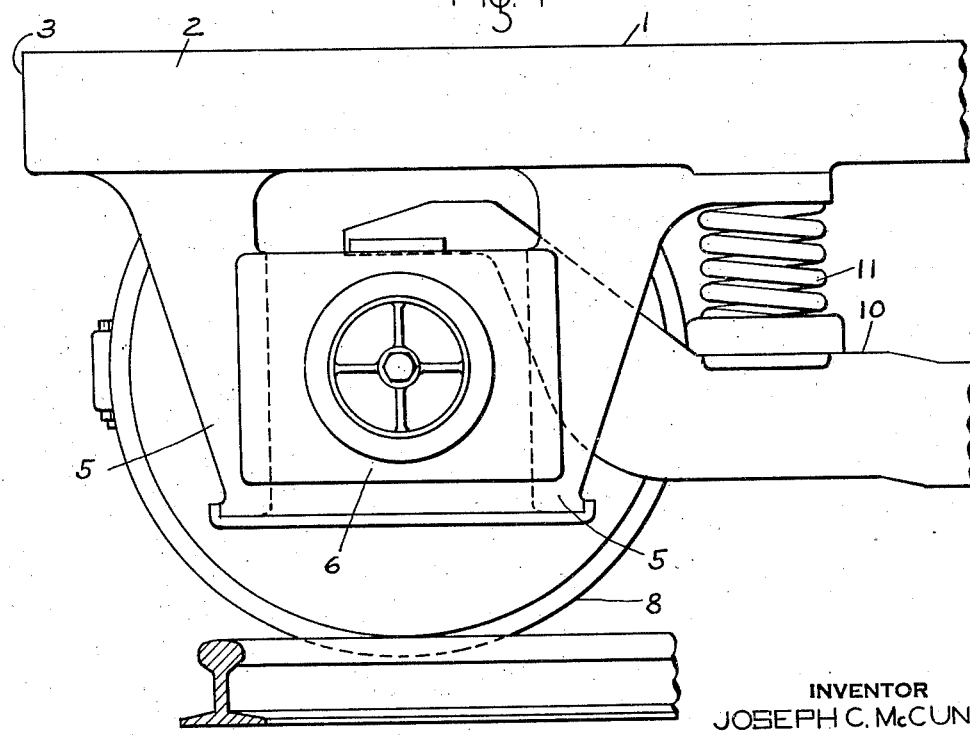

In the accompanying drawings, Fig. 1 is a plan view partly in section of a portion of a railway vehicle truck embodying the invention; Figs. 2 and 3 are sectional views taken on the line 2—2 and 3—3 in Fig. 1; Fig. 4 is a side view of the portion of the vehicle truck shown in Fig. 1; and Fig. 5 is a diagrammatic view of a portion of the brake leverage system embodied in the structure shown in Figs. 1 and 2.

As shown in the drawings, the invention is embodied in a railway vehicle truck which may comprise a truck 1 of any desired construction having spaced parallel side frames 2 connected at their ends by transversely extending end members 3, and adjacent the center of the truck the side frames are connected by spaced parallel transversely extending transoms 4, only one end member and transom being shown.

The side frames 2 are provided with the usual truck pedestals 5 and slidably mounted in the pedestals are journal boxes 6 in which are rotatably mounted the ends of an axle 7 on which wheels 8 are secured in spaced relation in the usual manner.

The vehicle truck is preferably of the type in which there is provided at each side an equalizer bar 10 extending between and carried on the tops of the two journal boxes 6. Springs 11 are carried by the equalizer bars 10 and resiliently support the frame 1. A further description of the vehicle truck is not deemed essential to a clear understanding of the invention.

A sleeve element 13, formed of two complementary parts encircling the axle 7 and secured together by bolts 14, is secured by bolts 15 to the inside face of each of the wheels 8 in concentric relation with said wheels, it being noted that said elements are secured to the wheels at points located preferably closer to their peripheries than to their axes thus providing braking force transmitting connections having relatively long lever arms.

The sleeve elements 13 are provided at their inner ends with two oppositely disposed radially extending arms 16 each of which arms is formed in two sections, one section being integral with each of the two parts of the sleeve elements, and said sections being rigidly clamped together by bolts 17. Each of the arms is provided with a bore spaced from the axle 7 and defined by the two sections of the arm, and rigidly clamped in these bores are the adjacent ends of two laterally extending rods 18. The two rods 18 are thus disposed diametrically opposite each other on opposite sides of axle 7 and in parallel relation to the axis of said axle, and it will be noted that these rods and the elements 13 form a substantially rigid connection between the wheels 8.

Each of the sleeve elements 13 is provided between the arms 16 and the adjacent wheel 8 with an annular bearing 20 upon which is journaled a bearing member 21 having two oppositely disposed radial arms 22, said members and arms being formed in two complementary sections rigidly secured together and to the bearings 20 by bolts 23. A bore is provided in each of the arms 22, half of the bore being in each of the two sections of the arms, which bore extends parallel with the axis of axle 7 and which is spaced a greater distance from said axis than are the rods 18. Secured in these bores are the ends of two rods 24, each of said ends being encircled by a shock absorbing bushing 25 made of rubber or the like. It will be noted that the two rods 24 which are clamped in the arms 22 of the bearing element 21 are disposed parallel to but spaced from the rods 18.

One arm 22 of each of the bearing members 21 is provided with a jaw 27 extending radially outwardly from the axle 7 and into each of these jaws loosely fits a tongue 28 projecting from any suitable portion of the truck frame 1, such as the transom 4, the jaws and tongues being provided to hold the rods 24 and parts carried thereby, against rotation with the axle 7 as will hereinafter more fully appear.

From the above description it will be noted that the brake rods 18 secured to the inner ends of the sleeve elements 13 are adapted to rotate with the wheels 7, while the rods 24 carried by the bearing members 21 and spaced from the rods 18 are secured against rotation by the interengagement of tongues 28 and jaws 27. It will be further noted that the bearings 20 on the sleeve elements 13 are recessed for engagement with the bearing members 21 thereby securing the rods 24 against movement longitudinally of axle 7. Dust protectors 29 preferably in the form of felt rings secured in the bearing members 21 each side of the bearings 20, engage the sleeve elements 13 for keeping foreign matter from entering said bearings.

The wheels 8 are usually pressed on to the axles 7 and the distance between two wheels of one wheel and axle assembly may be different from that between the wheels of another wheel and axle assembly and as a consequence the distance between the sleeve elements 13 may vary slightly in different assemblies. This variation in the distance between the wheels 8 on different wheel and axle assemblies is however held within predetermined limits, and the ends of the rods 18 and 24 are adapted to be adjusted and clamped to the sleeve elements 13 and bearing arms 22 to compensate for any such variations.

Disposed between the rods 18 and 24 and encircling the axle 7 are a plurality of interleaved rotatable friction disc braking elements 30 and non-rotatable friction disc braking elements 31 and 31'. The rotatable elements 30 are identical in construction and each is formed in two complementary semi-circular sections 32 and 33 rigidly secured together by bolts 34 provided through oppositely arranged inwardly directed projections 35, which projections are slidably mounted on the rods 18.

The non-rotatable elements 31 and 31' are each formed in complementary semi-circular sections 36 and 37 rigidly secured together by bolts 38 provided through oppositely arranged outwardly directed projections 39, which projections are slidably mounted on the rods 24.

In the illustration there are shown two non-rotatable brake elements 31, two non-rotatable elements 31' and three interleaved rotatable brake elements 30, the outside elements being the non-rotatable elements 31. Each of the outside non-rotatable elements 31 is in the form of a single annular disc comprising the two rigidly connected sections 36 and 37 above described, but each of the inside non-rotatable elements 31' comprises two oppositely disposed spaced discs each of which is preferably identical to the outside elements 31. In order to thus space the two discs of the inside non-rotatable elements 31' the projections 39 are thickened on the sides opposite the friction braking faces and the two discs comprising each of the inside elements 31' are put together so that these thickened portions engage, this spacing being provided for the circulation of air currents to dissipate heat.

Two spaced collars 40 are provided on each of the rods 18 outside the projections 35 of the two end rotatable elements 30 for engagement by said projections to define the brake release position of said elements, and on both of said rods, springs 41 are provided acting on the adjacent projections 35 for centralizing the center element 30 with respect to those at the ends.

Two spaced collars 42 are provided on each of the rods 24 outside of and adapted to be engaged by the projections 39 of the non-rotatable elements 31 for defining their release positions, and between each pair of non-rotatable elements and on both of said rods there is provided a spring 43 for centralizing the two inner non-rotatable elements 31' with respect to the two outside non-rotatable elements. The collars 40 and springs 41 on the rods 18 and collars 42 and springs 43 on the rods 24 are so designed and arranged as to position the rotatable and non-rotatable elements so that there will be no contact between them when the brakes are released, as will be hereinafter described.

The brake mechanism as so far described may be similar to that disclosed in the aforementioned pending application, if desired, and in view of this a further detailed description of the construction and operation thereof is not deemed essential in the present application to a comprehensive understanding of the invention.

According to the invention there is provided in the outer face of each of the two outside non-rotatable elements 31 three spaced pins 45, these pins being preferably substantially 120° apart and constituting struts through the medium of which pressure is adapted to be applied to said elements for effecting braking of the wheels 8 in a manner to be hereinafter described.

An annular ring like element 46 encircling the axle 7 between the two sets of rods 18 and 24 is provided for engagement with each set of the strut pins 45. Each of the elements 46 is preferably made in the form of two substantially semi-circular sections secured together by bolts 47, and each is suspended on a bolt 48 having a T head disposed to slide in a slot 49 provided in a channel 50 which may extend between and be carried by the side frames 2 or any suitable portion of the truck frame 1. By this construction it will be evident that the elements 46 will move vertically with the truck frame 1 and therefore relative to the pins 45 secured in the nonrotatable elements 31, but the width of the elements 46 is such as to engage the pins 45 in all vertical positions which the truck frame 1 may assume with respect to wheels 8, due for instance to changes in load and consequent depression or expansion of the springs 11.

At one side of the brake assembly thus far described there is provided a conventional brake cylinder 51 adapted to be secured to any suitable portion of the truck frame 1. In Figs. 1 and 2 of the drawings the brake cylinder 51 is shown secured to transom 4 near the top thereof and with its axis arranged parallel to that of the axle 7.

The brake cylinder 51 contains the usual piston 52 connected to a piston rod 54 and adapted to be operated by fluid under pressure for moving said rod outwardly, that is, in a direction towards the left hand as viewed in Figs. 1 and 5 of the drawings for effecting an application of the brakes. The brake cylinder is further provided with the usual release spring 53, which is operative upon the release of fluid under pressure from the brake cylinder to move the piston 52 and thereby the rod 54 back to the release position in effecting the release of the brakes in the usual manner, the parts being shown in the usual brake release position.

The brake cylinder 51 is provided on the pressure end with the usual mounting lugs 55 and pivotally mounted on a bolt 56 secured in said lugs is one end of a brake lever 57 the opposite end of which is bifurcated and pivotally connected by means of bolts 59 to diametrically opposite lugs 58 provided on the adjacent pressure transmitting element 46.

A lever 60, like the lever 57, is connected at one end to the piston rod 54 through the medium of a bolt 61 while the opposite bifurcated end of the lever 60 is pivotally connected to lugs 58 on the adjacent pressure transmitting element 46 through the medium of bolts 59. It will be noted that the axle 7 is disposed between the forks of the levers 57 and 60 and that said forks are disposed out of the path of rotation of the rods 18 so as not to interfere in any way with the usual rotation of the wheels 7 and the elements connected to said wheels for rotation therewith. The two levers 57 and 60 are pivotally connected together by a tie rod 62 disposed outside of and extending substantially parallel to the axes of the brake elements 30 and 31.

In operation, assuming that the wheels 8 are rotating and that it is desired to brake said wheels, fluid under pressure is supplied to the brake cylinder 51 in any desired manner and acts therein on the piston 52 to move the piston rod 54 outwardly of the cylinder in the direction toward the left hand. This movement of the rod 54 acts to rock the brake lever 60 in a counterclockwise direction and through the medium of the tie rod 62 acts to rock the brake lever 57 in a clockwise direction thereby forcing the forked ends of said levers and the pressure transmitting elements 46 in a direction towards each other.

As the elements 46 are thus moved toward each other each applies force to the adjacent strut pins 45 and thereby acts to slide the outer non-rotatable elements 31 along the rods 24 into frictional engagement with the adjacent rotatable elements 30. The elements 30 are then picked up and slipped along the rods 18 into frictional engagement with the two inner non-rotatable elements 31' which are in turn picked up and slipped along the rods 24 into frictional engagement with the center rotatable element 30.

After the elements 30, 31 and 31' are thus all moved into frictional engagement they are subjected through the medium of strut pins 45 to the pressure applied to elements 46 by the brake cylinder 51 through the medium of the levers 57 and 60, and the resulting braking force applied to the rotatable elements 30 is transmitted through the rods 18 and sleeve elements 13 to the wheels 8 and acts to brake said wheels.

The degree with which the wheels 8 are braked is of course dependent upon the pressure with which the rotatable and non-rotatable elements are pressed into frictional engagement and this pressure depends upon the pressure of fluid supplied to the brake cylinder 51 which may be varied in the usual manner.

In order to effect a release of the brakes after an application fluid under pressure is vented from the brake cylinder 51 in any desired manner, and as a consequence the release spring 53 in said cylinder acts to move said piston and thereby the rod 54 back to the release position, shown in the drawings. This movement of rod 54 draws the upper end of lever 60 in the direction toward the brake cylinder 51 and through the medium of the tie rod 62 acts to rotate the lever 57 in a counterclockwise direction thereby moving the forked ends of said levers and the pressure elements 46 away from each other. As a result of this separation of the pressure elements 46 the several springs 43 acting between the non-rotatable elements 31 and 31' and the springs 41 acting between the rotatable elements 30 move said elements to their disengaged positions shown in the drawings.

It will be noted that since the brake cylinder 51 is secured to the truck transom 4 and the pressure elements 46 are secured to the truck frame through the medium of the T headed bolts 48 and the cross-member 50, said cylinder and pressure elements 46, as well as the two levers 57 and 60 and connecting rod 62, are carried by and move with the truck frame 1, as a result of which the pressure transmitted to the braking elements 46 upon operation of the brake cylinder 51 is not influenced by the position which the truck frame 1 may assume relative to the wheels 8 due to change in the load carried by the truck, or the like.

It will however be noted that vertical movement of the pressure elements 46 is relative to the adjacent strut pins 45, but regardless of the vertical position which said elements may assume they are adapted to engage all of said pins. As a consequence, whatever pressure is applied to the pressure elements 46, due to operation of the brake cylinder 51, is transmitted directly to the strut pins 45 and since this pressure is independent of the vertical position of the truck frame 1 relative to the wheels 8, it will be noted that the pressure transmitted through the strut pins 45 to the friction braking elements 30 and 31 in effecting an application of the brakes, is likewise independent of the vertical position of the truck frame with respect to the wheels 8.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A brake mechanism for a vehicle having a truck provided with a pair of oppositely disposed wheels, said mechanism comprising an annular rotatable friction brake element, means carried by said wheels for supporting said element to rotate with said wheels, an annular non-rotatable friction element, unsprung means associated with said wheels for supporting said non-rotatable element in cooperative relation with said rotatable element, a member associated with said vehicle and capable of vertical movement relative to said wheels, and a brake cylinder carried by said member for moving said elements into frictional braking engagement.

2. A brake mechanism for a vehicle truck having a pair of oppositely disposed wheels, spring means supported by said wheels and a member carried by said spring means and capable of movement vertically relative to said wheels, said mechanism comprising an annular rotatable friction brake element, means carried by said wheels for supporting said element to rotate with said wheels, a non-rotatable friction brake element, unsprung means associated with said wheels for supporting said non-rotatable element in cooperative relation with said rotatable element, and a brake cylinder carried by said member for moving said elements into frictional braking engagement.

3. A brake mechanism for a vehicle having a truck provided with a pair of oppositely disposed wheels, a truck frame, and spring means supported by said wheels and carrying said truck frame, said mechanism comprising an annular rotatable friction brake element, means unsprung extending between and secured to said wheels for supporting said element to rotate with said wheels, an annular non-rotatable friction brake element supported by said unsprung means in cooperative relation with said rotatable element, and a brake cylinder carried by said truck frame for moving said elements into frictional engagement.

4. A brake mechanism for a vehicle truck having a wheel and axle assembly, spring means carried by said assembly, and a truck member supported by said spring means and capable of movement vertically relative to said assembly, said mechanism comprising an annular rotatable friction element encircling said axle, a structure extending between and secured to said wheels for supporting said element to rotate with said wheels, an annular non-rotatable friction element encircling said axle means journaled on said structure supporting said non-rotatable element in cooperative relation with said rotatable element, and a brake cylinder carried by said member for moving said elements into frictional braking engagement.

5. A brake mechanism for a vehicle truck having a pair of oppositely disposed spaced wheels, spring means supported by said wheels, and a member carried by said spring means and adapted to move vertically relative to said wheels, said mechanism comprising a substantially rigid structure secured to and rotatable with said wheels, an annular friction brake element secured to and rotatable with said structure in concentric relation with said wheels, a non-rotatable friction brake element secured to said structure in concentric relation with said rotatable element, and a brake cylinder carried by said member and connected to said elements for moving said elements into frictional braking engagement.

6. A brake mechanism for a vehicle truck having a pair of oppositely disposed wheels, spring means supported by said wheels and a member carried by said spring means and capable of movement vertically relative to said wheels, said mechanism comprising an annular rotatable friction brake element, means carried by said wheels for supporting said element to rotate with said wheels, an annular non-rotatable friction element, unsprung means carried by said wheels for supporting said non-rotatable element in cooperative relation with said rotatable element, a brake cylinder carried by said member and operatively connected to said elements for moving said elements into frictional engagement, and means in the operating connection between said brake cylinder and elements carried by and movable with said member in a vertical direction relative to said elements and operative to transmit substantially the same proportional pressure from said brake cylinder to said elements in all vertical positions of said brake cylinder relative to said elements.

7. A brake mechanism for a vehicle truck having a pair of oppositely disposed wheels, spring means carried by said wheels and a member supported by said spring means and capable of vertical movement relative to said wheels, said mechanism comprising an annular rotatable friction brake element, unsprung means carried by said wheels for supporting said element to rotate with said wheels, an annular non-rotatable friction brake element, unsprung means carried by said wheels for supporting said non-rotatable element in cooperative relation with said rotatable element, a brake cylinder secured to said member for movement therewith, lever means operative by said brake cylinder to move said elements into frictional engagement, said lever means being supported from said member and movable therewith in a vertical direction relative to said elements and means associated with said lever means operative to provide substantially the same leverage between said brake cylinder and elements in all vertical positions of said brake cylinder with respect to said elements.

8. A brake mechanism for a vehicle truck having a pair of oppositely disposed wheels, spring means carried by said wheels and a member supported by said spring means and capable of vertical movement relative to said wheels, said mechanism comprising an annular rotatable friction brake element, unsprung means carried by said wheels for supporting said element to rotate with said wheels, an annular non-rotatable friction brake element, unsprung means carried by said wheels for supporting said non-rotatable element in cooperative relation with said rotatable element, a brake cylinder secured to said member for movement therewith, lever means connected to said brake cylinder and movable as a whole with said member and having a floating operating connection with said elements and operative by said brake cylinder to move said elements into frictional engagement, and means associated with said lever means operative to provide substantially the same leverage between said brake cylinder and elements in all vertical positions of said brake cylinder with respect to said wheels.

9. A brake mechanism for a vehicle truck having a pair of oppositely disposed wheels, spring means carried by said wheels and a member supported by said spring means and capable of vertical movement relative to said wheels, said mechanism comprising an annular rotatable friction brake element, unsprung means carried by said wheels for supporting said element to rotate with said wheels, an annular non-rotatable friction brake element, unsprung means carried by said wheels for supporting said non-rotatable element in cooperative relation with said rotatable element, a brake cylinder secured to said member for movement therewith, lever means connected to said brake cylinder and movable with said member, said lever means being operative by said brake cylinder to move said elements into frictional engagement, and means in the operating connection between said lever means and elements movable with said member relative to said elements and operative to maintain substantially the same leverage between said brake cylinder and elements in all vertical positions of said brake cylinder with respect to said elements.

10. A brake mechanism for a vehicle truck having a pair of oppositely disposed wheels, spring means carried by said wheels and a member supported by said spring means and capable of vertical movement relative to said wheels, said mechanism comprising an annular rotatable friction brake element, unsprung means carried by said wheels for supporting said element to rotate with said wheels, an annular non-rotatable friction brake element, unsprung means carried by said wheels for supporting said non-rotatable element in cooperative relation with said rotatable element, a brake cylinder secured to said member for movement therewith, and lever means connected to said brake cylinder and operative thereby to move said elements into frictional engagement, said lever means being carried by and movable with said member relative to said elements in a vertical direction.

11. A brake mechanism for a vehicle truck having a pair of oppositely disposed wheels, spring means carried by said wheels and a member supported by said spring means and capable of vertical movement relative to said wheels, said mechanism comprising an annular rotatable friction brake element, unsprung means carried by said wheels for supporting said element to rotate with said wheels, an annular non-rotatable friction brake element, unsprung means carried by said wheels for supporting said non-rotatable element in cooperative relation with said rotatable element, a brake cylinder secured to said member for movement therewith, lever means operative by said brake cylinder to move said elements into frictional engagement, and means associated with said lever means and adjustable according to the vertical position of said brake cylinder with respect to said elements to provide the same leverage between said brake cylinder and elements in all vertical positions assumed by said brake cylinder with respect to said elements.

12. A brake mechanism for a vehicle truck having a pair of oppositely disposed wheels, spring means carried by said said wheels and a member supported by said spring means and capable of vertical movement relative to said wheels, said mechanism comprising an annular rotatable friction brake element, unsprung means carried by said wheels for supporting said element to rotate with said wheels, an annular non-rotatable friction brake element, unsprung means carried by said wheels for supporting said non-rotatable element in cooperative relation with said rotatable element, a brake cylinder secured to said member for movement therewith, lever means operative by said brake cylinder to move said elements into frictional engagement, transfer means for applying pressure from said lever means to said elements a chosen distance from the axis of said elements, and means adjustable according to vertical movement of said brake cylinder with respect to said elements to provide the same leverage between said brake cylinder and transfer means in all vertical positions of said brake cylinder with respect to said elements.

13. A brake mechanism for a vehicle truck having a pair of oppositely disposed wheels, spring means carried by said wheels and a member supported by said spring means and capable of vertical movement relative to said wheels, said mechanism comprising an annular rotatable friction brake element, means secured to said wheels for supporting said element to rotate with said wheels, and annular non-rotatable friction brake element carried by said means in cooperative relation with said rotatable element, a brake cylinder secured to said member for movement therewith, lever means pivotally connected to said brake cylinder and supported by said member for movement therewith in a vertical direction relative to said elements and operative by said brake cylinder to move said elements into frictional engagement, and means forming a pressure transfer connection between said lever means and elements operative upon the operation of said brake cylinder to apply pressure to said elements a fixed distance from the axis of rotation of said elements regardless of the vertical position of said brake cylinder.

14. A brake mechanism for a vehicle having a truck provided with a pair of oppositely disposed wheels, said mechanism comprising annular rotatable and non-rotatable friction brake elements disposed in cooperative relation between the wheels and concentric with the axis of the wheels, means secured to said wheels for supporting said elements, a brake cylinder carried by a sprung portion of the vehicle, and means operatively connecting said brake cylinder with said friction elements and including a pressure transmitting member having a vertical movement relative to said elements, pressure being transmitted from said member to said elements at regions in an annular zone which remains concentric with the wheel axis.

15. A brake mechanism for a vehicle having a truck provided with a pair of oppositely disposed wheels, said mechanism comprising annular rotatable and non-rotatable friction brake elements secured in cooperative relation between the wheels and concentric with the axis of the wheels, a brake cylinder carried by a sprung portion of the vehicle, and means operatively connecting said brake cylinder with said friction elements and including a pressure transmitting member having a vertical movement relative to said elements, and pressure receiving means secured to one of said elements a fixed distance from its axis and slidably engaged by said transmitting member.

16. A brake mechanism for a vehicle truck having a pair of oppositely disposed wheels, spring means carried by said wheels and a member supported by said spring means and capable of movement vertically relative to said wheels, said mechanism comprising an annular rotatable friction brake element, means secured to said wheels for supporting said element to rotate with said wheels, an annular non-rotatable friction brake element secured in cooperative relation with said rotatable element, one of said elements having a plurality of spaced, radially arranged pressure receiving elements operative when subjected to pressure to move said elements into frictional engagement, a rigid element carried by said member and movable vertically therewith and disposed to engage said pressure receiving elements in all vertical positions of said member with respect to said wheels, a brake cylinder carried by and movable with said member, and means operative by said brake cylinder for operating said rigid element to move said friction elements into frictional engagement.

17. A brake mechanism for a vehicle truck having a pair of oppositely disposed wheels, spring means carried by said wheels and a member supported by said spring means and capable of movement vertically relative to said wheels, said mechanism comprising an annular rotatable friction brake element, means secured to said wheels for supporting said element to rotate with said wheels, an annular non-rotatable friction brake element secured in cooperative relation with said rotatable element, one of said elements having a plurality of spaced radially arranged pressure receiving elements operative when subjected to pressure to move said brake elements into frictional engagement, an annular rigid element carried by said member for vertical movement therewith relative to said elements and disposed to engage said pressure receiving elements in all vertical positions of said member with respect to said wheels, a brake cylinder carried by and movable with said member, and lever means pivotally connected to said brake cylinder and rigid element and operative to apply pressure to said rigid element and thereby to said pressure receiving elements.

18. A brake mechanism for a vehicle truck having a pair of oppositely disposed wheels, spring means carried by said wheels and a member supported by said spring means and capable of movement vertically relative to said wheels, said mechanism comprising a pile of interleaved annular rotatable and non-rotatable friction elements disposed in cooperative relation between said wheels, means secured to said wheels for supporting said elements, a brake cylinder carried by and movable vertically with said member and disposed to operate in a direction parallel to the axis of said elements, two brake levers one connecting one end of said cylinder to one end of said pile of elements and the other connecting the other end of said brake cylinder to the other end of said pile of elements, and fulcrum means for said levers, said brake cylinder being adapted to be operated by fluid under pressure to operate said levers about said fulcrum means to apply pressure to both ends of said pile of elements.

19. A brake mechanism for a vehicle truck having a pair of oppositely disposed wheels, spring means carried by said wheels and a member supported by said spring means and capable of movement vertically relative to said wheels, said mechanism comprising a pile of interleaved annular rotatable and non-rotatable friction elements disposed in cooperative relation between said wheels, means secured to said wheels for supporting said elements, the end elements of said pile being provided with spaced pins arranged radially around their axes, a rigid annular element disposed at each end of said pile and carried by and movable vertically with said member and adapted in all vertical positions to engage said pins in the adjacent friction element, a brake cylinder carried by and movable vertically with said member, a brake lever connecting one end of said brake cylinder to one of said rigid elements, another brake lever connecting the other end of said brake cylinder to the other of said rigid elements, and a tie rod disposed between said brake cylinder and elements and pivotally connected at opposite ends to said levers.

20. In combination, a pair of oppositely disposed vehicle truck wheels, a vehicle truck frame, spring means supporting said frame from said wheels, a structure extending between and secured to said wheels, an annular rotatable friction element carried by said structure and rotatable with said wheels, an annular non-rotatable friction element carried by said structure in cooperative relation with said rotatable element, a brake cylinder secured to and movable with said truck frame, and lever means operatively connecting said brake cylinder to said elements for moving said elements into frictional engagement.

21. In combination, a pair of oppositely disposed vehicle truck wheels, a vehicle truck frame, spring means supporting said frame from said wheels, an annular rotatable friction element, means secured to said wheels for supporting said element to rotate with said wheels, an annular non-rotatable friction element secured in cooperative relation with said rotatable element, a brake cylinder secured to and movable with said truck frame, lever means carried by said frame and pivotally connected to said brake cylinder and disposed to move said elements into frictional engagement upon operation of said brake cylinder, and means interposed between said lever means and elements for maintaining substantially the same leverage between said brake cylinder and elements in all vertical positions of said brake cylinder and lever means with respect to said elements.

22. In combination, a pair of oppositely disposed vehicle truck wheels, a vehicle truck frame, spring means supporting said frame from said wheels, an annular rotatable friction element, means secured to said wheels for supporting said element to rotate with said wheels, an annular non-rotatable friction element secured in cooperative relation with said rotatable element, a brake cylinder secured to and movable with said truck frame, lever means carried by said frame and pivotally connected at one end to said brake cylinder and having the other end disposed to move said friction elements into frictional engagement upon operation of said brake cylinder, and means interposed between said other end of said lever means and the adjacent friction element forming a torque connection with said elements which is independent of movement of said truck frame.

23. A brake mechanism for a vehicle truck having a pair of oppositely disposed wheels, a truck frame and spring means supporting said frame from said wheels, said mechanism comprising a pile of interleaved annular rotatable and nonrotatable friction elements disposed between said wheels in concentric relation therewith, means secured to said wheels for supporting said elements, a brake cylinder carried by said frame, and means operatively connecting said brake cylinder and elements including a pressure transmitting member at both ends of said pile carried by and movable with said frame, and pressure receiving means between each of said transmitting members and the adjacent friction elements, said receiving means being secured to the adjacent friction elements in concentric relation therewith and being adapted to be slidably engaged by the adjacent transmitting members.

24. A brake mechanism for a vehicle truck having a pair of oppositely disposed wheels, a truck frame and spring means supporting said frame from said wheels, said mechanism comprising a pile of interleaved annular rotatable and non-rotatable friction elements disposed between said wheels in concentric relation therewith, means secured to said wheels for supporting said elements, a brake cylinder carried by said frame, and means operatively connecting said brake cylinder and elements including a pressure transmitting member at both ends of said pile carried by and movable with said frame, and adapted to transmit pressure to the end elements of said pile in an annular zone which remains concentric with said elements, a lever having one end pivotally connected to said brake cylinder and the opposite end forked and disposed to apply pressure to diametrically opposite portions of one of said transmitting members, a like lever connecting the other end of said brake cylinder to the other transmitting member, and a tie rod connected at opposite ends to said levers, said brake cylinder being adapted to be operated by fluid under pressure to apply pressure to said transmitting members.

25. In a vehicle brake for a wheel and axle assembly of a railway car truck comprising a truck frame movable vertically relative to said wheel and axle assembly, in combination, a rotatable friction brake element and a non-rotatable friction brake element, said elements encircling the axle of said assembly and adapted to frictionally interengage with each other to brake said assembly, means secured to said assembly carrying said elements, and actuating means carried by said truck frame and operative to effect the frictional interengagement of said elements, said actuating means having a lost motion connection with said brake elements to permit the actuating means to move with the truck frame in a vertical direction relative to the brake elements.

26. In a vehicle brake for a wheel and axle assembly of a railway car truck comprising a truck frame movable vertically relative to said wheel and axle assembly, in combination, an annular rotatable friction brake element and an annular non-rotatable friction brake element, said elements encircling said axle and being secured to said assembly and adapted to frictionally interengage with each other to brake said assembly, mechanism carried by and movable with said truck frame and operative to force said elements into frictional engagement, and strut means interposed between said mechanism and elements for receiving pressure from said mechanism and applying said pressure to said elements a fixed distance from the axis thereof regardless of the vertical position of said mechanism with respect to said elements.

JOSEPH C. McCUNE.